United States Patent [19]

Lee

[11] Patent Number: 4,836,315

[45] Date of Patent: Jun. 6, 1989

[54] WEIGHING SCALE

[76] Inventor: Richard J. Lee, 3146 Kettle Moraine Rd., Hartford, Wis. 53027

[21] Appl. No.: 212,612

[22] Filed: Jun. 28, 1988

[51] Int. Cl.⁴ .......................... G01G 1/36; G01C 21/20
[52] U.S. Cl. ....................................... 177/247; 33/1 D
[58] Field of Search .......................... 177/247; 33/1 D

[56] References Cited

U.S. PATENT DOCUMENTS

| 930,875 | 6/1909 | McLeod | 177/247 X |
| 2,013,934 | 3/1935 | Waltz | 177/247 |
| 2,959,862 | 11/1960 | Jager | 33/1 D X |
| 4,453,610 | 1/1984 | Purdie | 177/247 |
| 4,720,699 | 1/1988 | Smith | 33/1 D X |

Primary Examiner—George H. Miller, Jr.
Attorney, Agent, or Firm—Fuller, Puerner & Hohenfeldt

[57] ABSTRACT

The balance beam of a scale is provided with a series of notches. A poise, preferably a metal ball, is movable along the balance beam to be set in one of the notches and retained there without clamping. A secondary counterpoise on the other side of the pivot of the scale beam from the primary poise is comprised of the slider of a vernier. The vernier scale on the slider uses slits instead of the usual lines as graduations so the vernier body serves as a mask about the slits. There are stationary graduations on the beam. The slider has a window through which the numbers indicative of the unit weight graduations on the beam are read. Tenths of units and even hundredths of units can be read using the vernier scale. The slit on the vernier scale that is filled in the background by a graduation on the beam is the pertinent unit value to be read. In one embodiment, background unit graduations appear in three consecutive slits and it is always the nominal middle of the three slits that is filled and is to be read when there are partially filled slits to the left and the right of the pertinent slit. The masked vernier can also be used on other measuring instruments that have a fixed scale over which the vernier scale translates.

18 Claims, 3 Drawing Sheets

FIG. 3

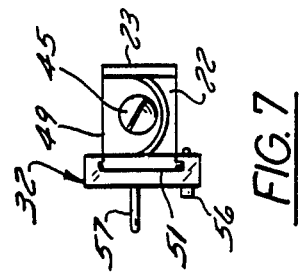
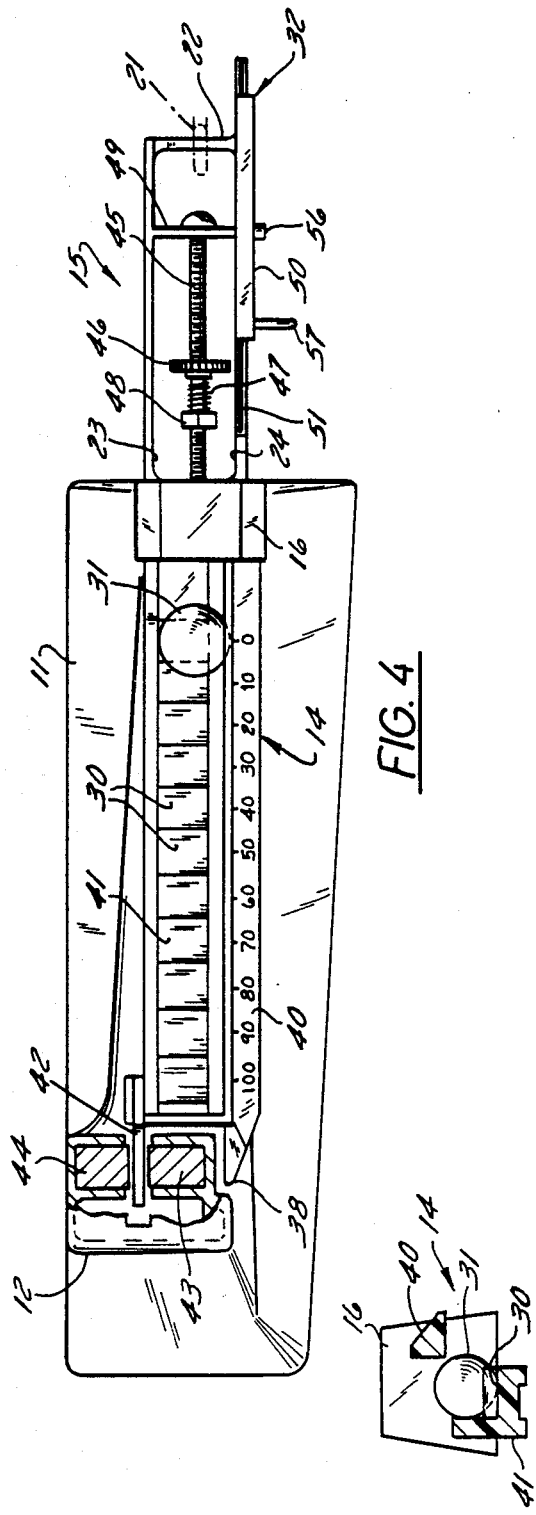
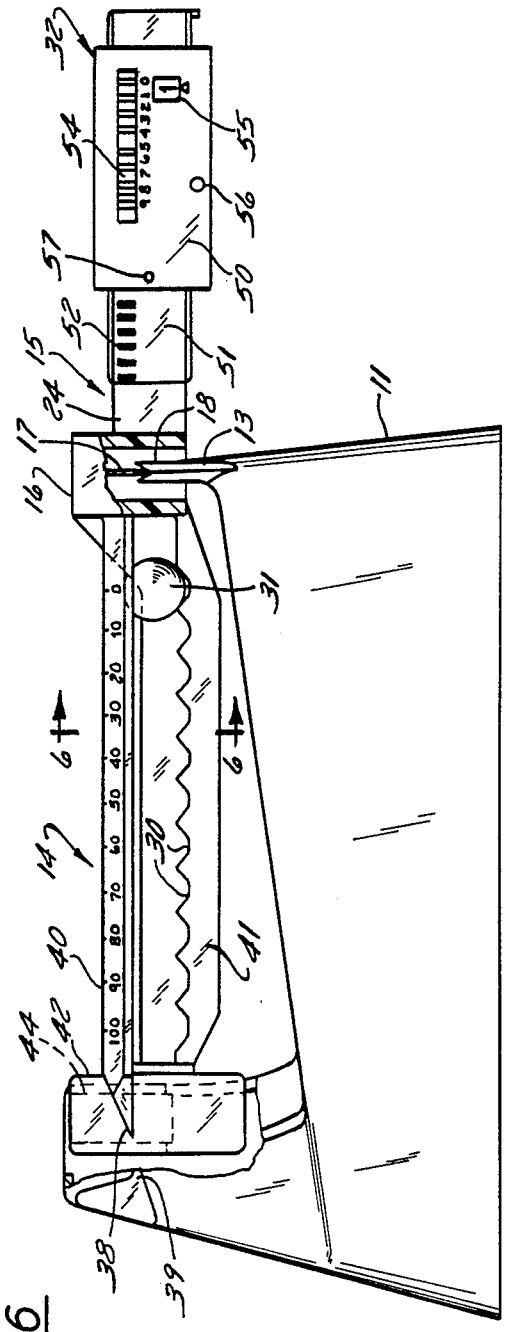

WEIGHING SCALE

BACKGROUND OF THE INVENTION

The invention disclosed herein relates to improvements in weighing scales of the type which use a graduated beam balanced on a knife edge pivot and a major poise movable along the beam on one side of the knife edge pivot to counterbalance at least a portion of the load which is carried on the other side of the pivot and has a minor graduation poise slidable along the beam portion on which the load is supported.

SUMMARY OF THE INVENTION

A basic object of the invention is to provide a weighing scale with which loads being weighed may be determined to relatively small increments.

An important new feature of the invention resides in providing a series of notches in the balance beam along one side of the beam pivot and providing a ball which is captured on the beam so that it cannot fall off but can be moved from notch to notch to serve as a primary poise. This poise can be positioned adjacent indicia on the beam which correspond to gross units of weight expressed in integer numbers.

Another new feature is provision of a second poise constituting a counterpoise that is preferably movable along the portion of the balance beam which is on the opposite side of the knife edge pivot from the major poise but it should be understood that the two poises can be on the same side of the beam relative to the pivot. The second poise is slidable along the beam and provides for reading fractions of the primary weight units.

An important new feature of the second poise is that it provides for reading fractional weight units with a masked vernier scale which is unique in that it is easier to read than traditional verniers and eliminates the usual problem with vernier scales of estimating quickly which of a series of graduation marks on a movable vernier is in perfect alignment with one of a series of graduations of a primary scale on the beam on which the vernier slides. In accordance with the invention, the vernier or second poise is movable for determining fractional parts of weight units.

How the foregoing objectives and features are achieved, will be evident in a more detailed description of a preferred embodiment of the improved weighing scale which will now be set forth in reference to the drawings.

DESCRIPTION OF THE DRAWINGS

FIG. 4 is a top plan view of the scale with some parts broken away and others in section to allow for showing the means for magnetically dampening movements of the scale beam so the beam settles to a balanced condition more rapidly;

FIG. 5 is a side elevational view of the weighing scale with a part broken away to permit showing the knife edge pivot for the scale beam;

FIG. 6 is a transverse section through the scale beam taken on a line corresponding with 6—6 in FIG. 5;

FIG. 7 is a view of the right end of the scale beam that is depicted in FIG. 5;

DESCRIPTION OF A PREFERRED EMBODIMENT

Figure 1:
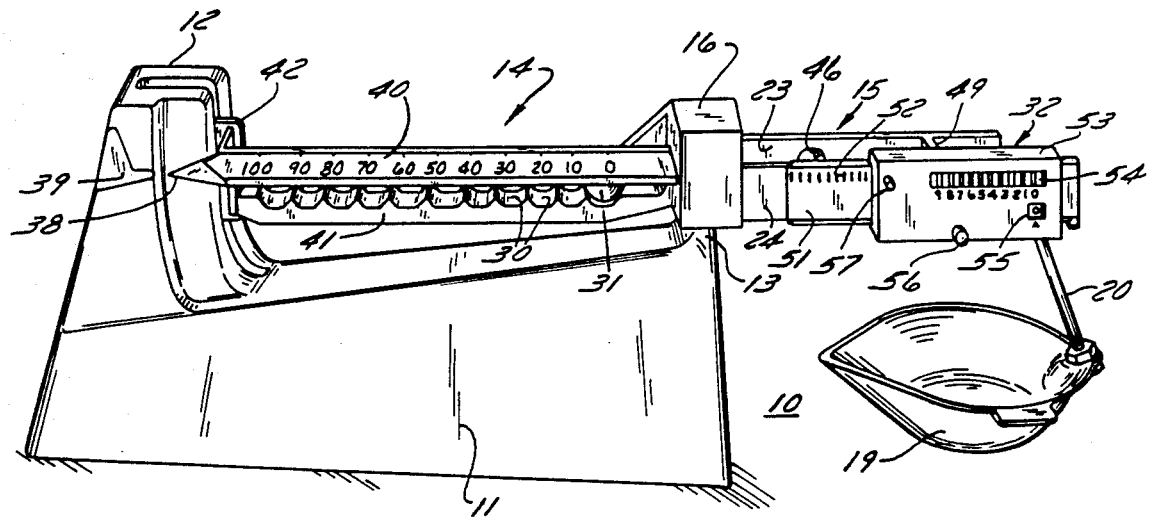
FIG. 1 is a side elevational view of the improved weighing scale.

In FIG. 1 the weighing scale is designated generally by the reference numeral 10. It comprises a body including a base portion 11 and two upright posts 12 and 13 which are integral with the body 11. In this design, the body is cast as a unit. The weighing scale has a balance beam comprised of two continuous or integral parts 14 and 15 on which an enclosure 16 is formed. FIG. 5 shows part of enclosure 16 broken away to reveal a beam balancing knife edge 17 which is fixed in the enclosure. A razor sharp lower edge of knife 17 registers in a v-shaped groove 18 which is formed on upright part 13 of the scale body 11. The sharp edge on knife 17 constitutes the pivot line for the balance beam whose portions 14 and 15 are on opposite sides of the pivot point.

Referring again to FIG. 1, in the illustrated design, a substance that is to be weighed is deposited in a pan 19 which is supported by a rod 20 at whose upper end there is a hook 21 hooked onto a web 22 which spans between parallel sides 23 and 24 of the beam. Web 22 is visible in FIG. 4.

Referring to FIGS. 1 and 4, one may see that the part 41 of balance beam portion 14 is provided with a series of v-shaped notches or recesses 30 in any of which a ball 31 may be placed. Ball 31 serves as a major weight unit poise. There are a series of whole numbers 0 to 100 in increments of 10 on the beam in correspondence with recesses 30. In the particular illustrated model, each increment represents a weight of 10 grains. The ball 31 is presently nested in the recess 30 next to the zero (0) graduation. Ball 31 is not an ordinary ball bearing. It is non-magnetic stainless steel and has a very accurately determined weight. The illustrated scale is a model that is especially designed for weighing powder and fulfills the needs of those who reload ammunition cases. The range of the illustrated scale is from 0.1 (1/10) of a grain to 110 grains. Another model of the scale for chemical laboratory use, for instance, will have a wider range and will be calibrated in grams. If the scale in FIG. 1 is to be used to determine the weight of less than 10 grains of powder or another material, ball poise 31 would be set in the notch adjacent the 0 graduation on balance beam portion 14. If, to take another example, 42 grains of a substance is to be measured, the ball poise 13 would be set in the notch adjacent the 40 grain graduation mark and the integer weight units or grains above 40 and the tenths of grains would be measured using the new masked vernier poise which is generally designated by the numeral 32 and will be discussed in greater detail later. A metal cube, not shown, could be used for the poise 31 instead of the ball, in which case the angle between the sides of the v-shaped recesses 30 should be slightly less than ninety degrees so the sides of the cube rest on two lines of contact to ensure reproducibility in relocating the poise on the beam.

Referring to FIGS. 1, 4, 5 and 6, one may see that the 10 grain graduations 0-100 on beam portion 14 are embossed or otherwise printed on a ball capturing rail frame member 40 of balance beam portion 14. FIG. 6 shows a cross section of the elongated notched member 41 of the balance beam portion 14. It also shows that notched member 41 of balance beam portion 14 junctions with the pivot blade housing 16. In FIG. 6 there is a gap between the upper end of notched member 41 and the corner of rail member 40 through which the ball 31 is pressed so it can be moved along the series of notches or recesses 30 that are correlated with the graduations on rail 40 of beam portion 14.

Note in FIG. 1, for instance, that graduations bearing rail member 40 terminates at its left end in a point 38. Balance condition of the scale is indicated when the swinging point 38 settles into alignment with a stationary reference point 39 or balance marker that is inscribed or otherwise formed on upright post member 12 of the scale body.

As can be seen in FIG. 4 particularly well, there is a metal plate 42 fastened to the outboard end of beam portion 14. Plate 42 is made of a nonmagnetic conductor such as aluminum or copper. This plate is arranged between two permanent magnets 43 and 44 which induces an eddy current that produces a magnetic field which reacts with the field of the magnets to impart a drag on plate 42 and, hence, on the whole beam to dampen its swinging movements that result from adding material to the weighing pan 19 of the scale.

Even if there is no load of material in weighing pan 19, there is always a possibility that an adjustment will have to be made before the beam balances at no load, that is, before pointer 38 aligns with stationary marker 39. For the purpose of zeroing the beam or obtaining balance with no load, a threaded stem 45 is fixed in balance beam portion 15. Stem 45 is not turned to obtain zero balance. Rather, a thumb wheel 46 is turned in one direction or the other so it moves toward or away from the pivot line 18 as required to obtain balance with no load in the pan 19. Thumb wheel 46 is retained against inadvertent rotation by means of a spring 47 which reacts against a nut 48 that is screwed onto stem 45. FIG. 7 shows how threaded stem 45 is retained in a web 49 of the balance beam. FIG. 7 also shows a side view of the web 22 on which the hook 21 of the rod 20 that supports the pan 19 is engaged.

One implementation of the new masked vernier counterpoise or second poise 32 will now be discussed in greater detail. The vernier counterpoise permits reading out 0-9 weight units, such as 0-9 grains in this example, and also permits reading out tenths of grains. Hundredths of grains can be read if necessary. As shown in any of the figures, there is a flat surface 51 on beam portion 15 which extends from one side of the knife edge. There are a plurality of equally spaced apart graduation lines 52 which form a stationary primary scale on surface 51. This scale is graduated in grains. There is a vernier element 53 constituting a second poise or counterpoise which is slidable along surface 51 on the beam. Vernier element 53 comprises a mask member 50 which has a plurality of open narrow windows, called slits 54, in it. The row of slits, as will be explained, are graduations constituting a vernier scale which is also called an auxiliary scale. There are 10 slits numbered 0-9 in vernier 53 and these slits or graduations are equally spaced apart but spacing is different than the spacing of the stationary graduations 52 on the beam. Ten numbers in this case which relate to the graduations 52 are visible through a window 55 in vernier 53. This is a reference or index means. The distance between the slits 54 is equal to nine-tenths of the distance between graduation lines 52.

Generally, the graduations of the auxiliary vernier scale such as on calipers, for example, are at the edge of the vernier slider and run next to the stationary primary graduations on the non-sliding part of a caliper, for instance. If a fraction of a measuring unit such as a fraction of a grain is to be visualized, it is the coincidence of a graduation on the movable vernier scale with a graduation on the stationary primary scale that determines what the fraction is. It is not always easy to decide which of any two adjacent graduations are perfectly aligned with each other in prior art verniers because markers for the graduations are fine lines and anyone having normal eyesight may not be absolutely certain which of the stationary and movable graduation lines align.

As will be explained, by letting the vernier act as a mask and graduating the vernier scale with slits, that are either open or transparent, instead of lines in accordance with the invention, alignment can be easily perceived. In accordance with the invention, a selected one of the slits will coincide with a stationary graduation 52 when the beam is balanced. The vernier scale may be made of a black material and the stationary graduations 52 may be embossed or otherwise printed with white paint or the like so there is good contrast between the black plastic separating the slit 54 and the graduation marks 52. Most accurate readings can be obtained if the primary graduation lines 52 are fine or narrow and the slits are correspondingly narrow. However, it was discovered that when the vernier is black and opaque, not enough light got into the slits so it was difficult to see the significant line 52. Hence, as shown, the sides of the slits are formed to diverge upwardly or form a sharp V to let more light enter and yet provide the equivalent of a narrow slit as a result of visualizing a line 52 relative to the apex of the V. Assume for ease of explanation that the graduation marks 52 are white though they are black in the drawing and assume that the beam and vernier counterpoise are black. The construction is such that the slit which is perfectly coincident with one of the primary graduations 52 will be filled with the white graduation marking and a trace or only a small slice of graduation markers will appear in the slits to the left and to the right of the slit which is filled with the color of a graduation marker 52. Experience has shown that it is easy to distinguish the significant slit from the slits on opposite sides of it. The v-shaped slits make it easier to visualize which primary graduation line 52 is centered in a slit.

Figure 2:
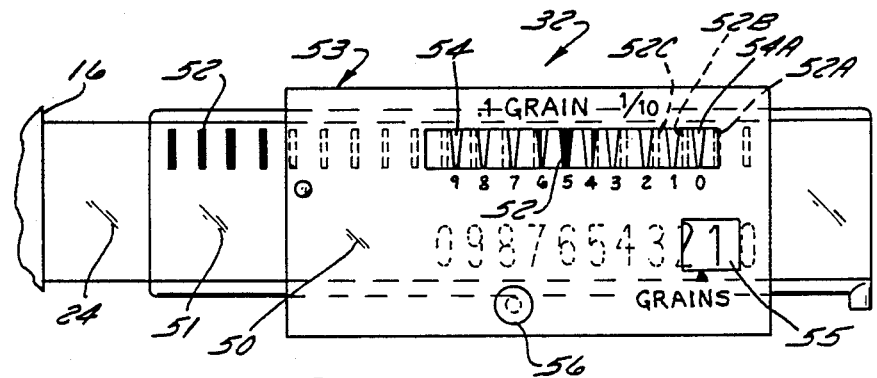
FIG. 2 is an enlargement of a second poise comprising part of a vernier system for measuring fractional weight units, the movable second poise being positioned along the balance beam to indicate a particular fractional unit of weight.

In the scale shown and described herein, the distance between each graduation mark 52 corresponds to one-tenth grain. In FIG. 2, for example, the number 1 appears presently in window 55 of the vernier slider 32. If the vernier scale containing slider were shifted so that "0" appeared in the window 55 and if primary poise ball 31 were in its home or 0 position, the beam balance pointer 42 should be aligned with stationary reference or zero mark 43 because the beam should be balanced if there were no load in pan 19. In FIG. 2, however, "1" appears in the window which means that if the beam were balanced at this time, material weighing one grain would have to be present in pan 19. The window 55 constitutes an index mark on the vernier. Sliding it from one graduation 52 to the next amounts to adding or subtracting one weight unit such as one grain for counterpoising against ball poise 31. As stated, the distance between the slits 54 in this example is equal to nine-tenths of the distance between the graduation marks 52. Thus, if the number 1 is fully exposed in index window 55 as shown and the first slit 54A in the vernier scale is aligned or coincident with the first fixed graduation marker 52A, if the ball poise 31 is in the 0 notch and there is no material in the pan, the beam would be balanced. If the counterpoise in the form of vernier slider 53 were moved to the left in FIG. 2 until slit 54A coincided with the next marker 52B to obtain beam balance, the weight in the scale pan as determined from the vernier would be 1.1 grains. At this time the next vernier slit marked "1" would fall short of the next stationary graduation mark 52C. Thus, if the first vernier slit 54A must move from 0 position to the first graduation mark 52B it is indicative of the one-tenth difference between the distances of the graduations 52 and the slits 54 has been made up. If the slider is moved to the left in FIG. 2 so that beam balance is obtained when the slit marked "1" is aligned with the graduation marked 52C, then two-tenths would be made up and the weight of the material in the scale pan 19 would be indicated to be 1.2 grains. In FIG. 2, however, it is the vernier scale slit "5" that is actually in perfect alignment with the fifth graduation mark 52 from the right end or 0 graduation mark 52A of the stationary scale. In FIG. 2, vernier scale slit "4" on the right side of the white filled slit "5" and vernier scale slit "6" on the left side of filled slit "5" are just partially filled by the fourth and sixth graduation marks 52. This is a merit of the invention in that the observer using the scale will know that it is not necessary to guess which of the slits on the vernier scale exactly aligns with a stationary graduation mark 52 because if any three of the slits reveal any of the graduation marker it will always be the one centered between the two on each side of it that is to be read. In other words, only three slits at a time can show any trace of a graduation marker 52 so all are eliminated except the one that is central to two others that are exposing some part of a graduation marker 52. In FIG. 2, then, the scale is reading 1.5 grains. If, for example, balance were obtained with the ball poise 31 set in the 50 grain notch in beam portion 14, the weight in the scale pan would be 50+1.5 or 51.5 grains.

It should be understood that the vernier slider or second poise 32 can be mounted on the balance beam on the left side of the knife edge as viewed in FIG. 5 instead of on the right side as shown. In such case the left beam portion 14 can be modified in a manner, not shown, but easily perceived by a skilled designer to allow the vernier element to slide directly on beam portion 14 or a beam portion, not shown, that is coextensive with portion 14 or generally parallel to it can be provided for the second poise which is in the form of a vernier slider. In any modification of course, the vernier slider would need to be slidable over the row of weight unit marks 52 without obscuring the numbers such as zero (0) to 100 which are marked on beam portion 14.

Figure 3:
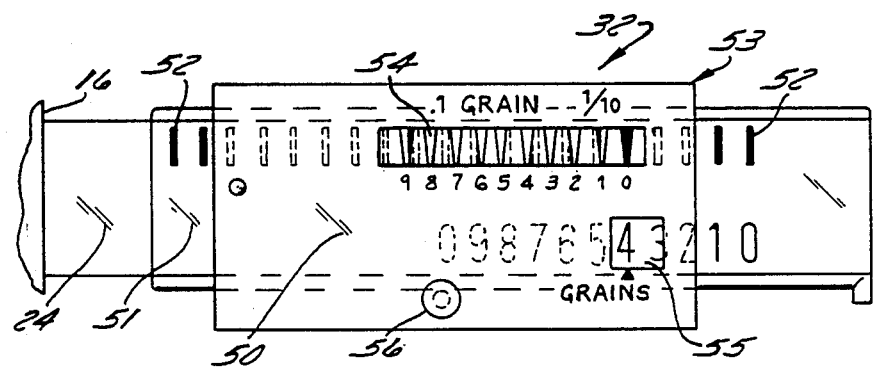
FIG. 3 is similar to FIG. 2 except that the second poise is adjusted to a different position to illustrate a case where the weight of the object on the scale corresponds with the basic weighing unit which is an integer number and there is no fractional part of a unit.

In the FIG. 3 example, assume that about 14 grains of a substance such as gun powder in pan 19 is to be weighed. In such case, the primary ball poise 31 would be set in the notch on beam portion 14 that is labeled 10 for 10 grains. In this case, the entire number 4 appears in the reference window 55 of the vernier second poise 53. Thus, in determining the weights, four grains would be added to the 10 grains to produce an integer number of 14 grains. The tenths of grains are again read using the counterpoise vernier slits. The vernier slit marked "0" is filled with the white stationary graduation marker 52. Part of a graduation marker appears in the slit marked "1" to the left of the completely filled slit marked "0". There is, of course, no opportunity for a slit to appear to the right of the slit marked "0". However, slit 9 is incompletely filled with a graduation marker 52. Thus, it will be evident that it is the last slit to the left, namely, "9" that is considered to be to the right of filled slit "0". The rule that it is the filled center slit between two partially filled slits that is pertinent still applies.

In a case which is not shown where the tenths of grains is "0.9" it would be the slit marked "9" that would be completely filled and slit 8 to the right of it and end around 0 would be partially filled.

If only two lines are visible in slits plus a tiny amount on either side, the poise scale is exactly half way between graduations and reading to 0.05 grain is possible. This kind of accuracy is rarely needed except, perhaps, when the scale is used in a laboratory.

In the embodiment of the vernier described thus far the scale, constituted by primary divisions 52, is graduated in grains. The vernier scale defined by slits 54 has 10 divisions that are equal in total length to 9 primary divisions. Each vernier scale division is therefore 1/10 grain smaller than a primary division. With no load on the scale pan 19 the vernier counterpoise 32 would have to be positioned so a zero (0) is centered in window 55 corresponding to the vernier being at the zero (0) or reference graduation 52, and the zero (0) slit on vernier scale would have to be coincident with the reference graduation for the beam to be balanced. If the vernier is shifted to the left now by one-tenth grain, the number 1 vernier graduation or slit coincides with a graduation or division line 52 so the readout would be 0.1 plus the number of grains, if any, taken from where the ball poise is located. The relationship between the primary and vernier scale divisions need not be restricted to units and tenths of units, however, although tenths are easiest to handle mentally. Finer vernier divisions can be harder to read out. But, for example, the weight of vernier 32 could be increased so that moving it through the distance between 2 slits changes the reading by 1/20 or 0.05 of a grain rather than 0.1 of a grain. In such case each of 20 vernier divisions would be made to equal 0.95 of a primary division. So if the vernier moved from zero position by 1 division to obtain balance, the weight would have had to increase by 0.05 of a grain.

The general rule is to let the parts into which the primary unit is to be divided be "P". Let the fraction of the primary unit or division that is given to a vernier division be "F". Then $$\frac{P-1}{P} = F$$

From the above example $$\frac{20-1}{20} = \frac{19}{20} = 0.95$$

In a commercial embodiment of the scale, the balance beam 14 is composed of phenolic resin which makes the scale economical to manufacture and at the same time makes it inherently safe. The phenolic material is dimensionally stable. It is also brittle and will break rather than bend. This is a desirable feature because there is assurance that the scale beam will retain original accuracy so long as it is not broken.

A push-pull snap lock pin 56 can lock the vernier poise on the beam. This is used when several quantities having the same weight are to be weighed. A pin 57 that can be grasped to slide the vernier poise along the beam is also provided.

Figure 8:
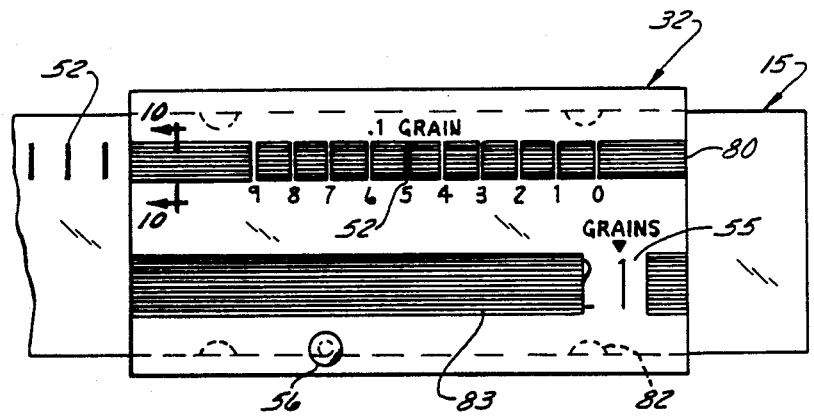
FIG. 8 shows a portion of the balance beam of the scale and a front elevational view of an alternative form of the vernier-type second poise.
Figure 9:
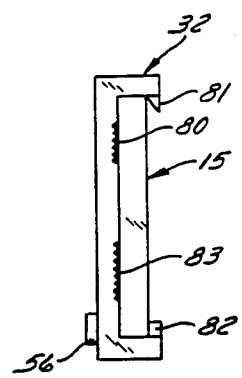
FIG. 9 is a view looking at the right end of the balance beam in the preceding figure.
Figure 10:
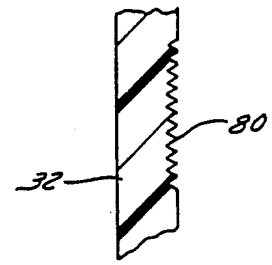
FIG. 10 is a section taken on the line corresponding with 10—10 in FIG. 8, the section being magnified to show the light diffusing serrations which are used in this particular embodiment of the vernier to mask out numerals or graduation lines inscribed on the underlying balance beam.

An alternative implementation of the masked vernier second poise is illustrated in FIGS. 8, 9 and 10. Parts having the same functional characteristics as in the FIGS. 1–7 embodiment are given the same reference numerals.

In FIG. 8, a fragment of the balance beam portion 15 on one side of the pivot line is shown broken away from the balance beam. The vernier member is again identified generally by the numeral 32. The beam has graduation lines 52 marked or otherwise inscribed on it. In this embodiment, the vernier counterpoise 32 can be considered to be made of a clear synthetic resin or plastic. A diffusion grating mask 80 extends across the length of second poise 32 across of the vernier 32 and is subdivided so that slits or windows or something equivalent to slits 0–9 are formed between the subdivisions. The grating 80 diffuses light that is transmitted or reflected and a smooth clear or even open slits 0–9 allow for clear visualization of the underlying graduation marks 52. An enlargement of the diffusion grating serrations 80 is depicted in FIG. 10. The markers 52 cannot be visualized through the diffusion grating but only through the slits. The back of the vernier member 32 is channel shaped having overhanging tabs such as those marked 81 and 82 which facilitates retaining the vernier on the balance beam portion 15 when the vernier is being slid along the beam. In FIG. 8 the vernier just happens to be positioned such that the underlying primary weight unit graduation line is coincident with and fully fills slit 5. So a weight of 0.5 of a grain is read from the vernier scale. In the embodiment, graduation lines 52 are fine or narrow and slits 0–9 are correspondingly narrow but there is adequate light for easy visualization of any line 52 coincident with a slit because of the vernier being transparent in some parts and translucent at the sides of the slits.

Another diffusion grating 83 extends lengthwise of the vernier member 32 except that this grating is interrupted to produce a clear or open area constituting a window 55 through which any numbers on the beam indicative of grain units can be read through the window. In the FIG. 8 example, the grain unit appearing is the number 1. Hence, the full information obtainable from the vernier is that the weight indicated is 1 and 0.05 grains. Of course, added to this amount would be the number of grains indicated adjacent the slot in which the ball poise 31 is positioned.

The FIGS. 8–10 embodiment is illustrative of just another one of the ways in which the new slit type vernier can be implemented. It will be understood that in place of the diffusion grating bands 80 and 83 a band of opaque paint, for example, could be used. The slits could be open or simply defined by the segments of the opaque band on each side of them. The graduation markers 52 could, for example, also be slit openings which allow light to pass through the vernier slits for being visualized by the user of the scale. Thus, the term "slit" as used in the description of the invention and in the claims is to be considered generic to a small narrow window whether it is open or closed by a transparent material. In the embodiment the vernier slider poise 32 could be mounted on the balance beam on the same side of the knife edge pivot 17 as the primary poise 31 as previously discussed.

Although an embodiment of the improved scale has been described in detail, such description is intended to be illustrative rather than limiting, for the new features can be variously embodied and are to be limited only by interpretation of the claims which follow.

I claim:

1. A weighing scale comprising:
   a base and a balance beam and means supporting said beam for pivoting on said base, a first portion of said beam being on one side of the pivot and a second portion being on the other side,
   means on said second portion of the beam for supporting the load to be weighed,
   the first portion of said beam having a row of equally spaced apart notches extending lengthwise of said portion and a movable primary poise comprising a ball registrable in any one of said notches, said primary poise serving to counterbalance said load when deposited in a selected one of said notches, and
   a second poise mounted slidably on said second portion of the beam.

2. The weighing scale according to claim 1 wherein said base, balance beam and second poise are composed of a brittle resin.

3. The weighing scale according to claim 2 wherein said resin is phenolic resin.

4. The weighing scale according to claim 1 including a guide rail element integral with said first portion of the balance beam, said rail element extending along said row of notches with sufficient clearance between said rail element and notches to allow said ball to be moved from one notch to another but not so much clearance that said ball would fall out of a notch.

5. The weighing scale according to claim 1 including a series of numbers on said first beam portion, a number being adjacent the respective notches, the notch nearest to said means supporting said beam for pivoting being given the value of zero (0) and notches successively more remote from the pivot increasing by 10 relative to the preceding number, said numbers corresponding to 10s of weight units,
   said second poise comprising a vernier slider slidable along the balance beam,
   a row of equally spaced apart graduation marks arranged along said second portion of the balance beam, said marks being numbered from zero (0) to 10 and said marks corresponding to numbers of individual weight units up to 10, said vernier slider having a row of zero (0) to at least 10 graduation marks defined by slits movable with said slider along said row of graduations on said second beam portion, the distance between said graduation marks on the slider being equal to nine-tenths of the distance between the graduations on the beam, coincidence of the center of one graduation mark on said vernier slider with any graduation mark on beam concurrently with balancing of said beam being indicative of the tenths of weight units in addition to the integer number of weight units in the load being weighed, said tenths of units being represented by the number of the graduation mark on said vernier slider that is coincident with said mark on the beam.

6. The weighing scale according to claim 1 including a series of numbers on said first beam portion, a number being adjacent the respective notches, the notch nearest to said means supporting said beam for pivoting being given the value of zero (0) and notches successively more remote from the pivot increasing by a uniform amount, said numbers corresponding to plural whole numbers of primary weight units (P), said second poise comprising a vernier slider slidable along said balance beam, a row of equally spaced apart graduation marks or divisions arranged along said balance beam, said marks being numbered from zero (0) consecutively upward and said marks corresponding to numbers of individual primary weight units (P), a vernier scale on said slider, said vernier scale being defined by a row of uniformly spaced apart slits constituting graduation divisions having values from zero upward, the spacing of the divisions of the vernier scale being a fraction (F) of the spacing or divisions (P) on the balance beam where:

$$F=(P-1)/p$$

coincidence of a slit on the vernier scale with any of said graduation marks on the beam concurrently with balancing of said beam being indicative of fractions of weight units represented by the value of the slit that is to be added to the number of the graduation mark on the beam with which the slit is coincident and added further to the value of primary weight units corresponding to the number of the notch at which the primary poise is located on the beam.

7. The weighing scale according to any one of claims 5 or 6 wherein:

said slits have such width that each slit on opposite sides of said slit that is coincident with said graduation mark on the balance beam shows only part of the width of a graduation mark on said beam.

8. The weighing scale according to claim 7 wherein the slits are defined by side edges and said side edges are diverging from each other.

9. A weighing scale comprising:

a base and a balance beam and means for supporting said beam for pivoting on said base, a first portion of the beam being on one side of the pivot and a second portion being on the other side, means on said second portion of the beam for supporting the load to be weighed, a poise mounted for being moved along said first portion of the beam to positions on the beam corresponding to values of plural primary weight units as said poise is moved away from the pivot, a second poise comprising a vernier element movable along said balance beam, a row of equally spaced apart graduation lines on said beam, movement or said vernier element through a distance equal to the space between two of said lines changing the balance of the scale by one primary weight unit, a series of consecutive numbers on said beam, the first number being a zero and following numbers going up to at least nine, the numbers being equally spaced apart corresponding to the same spacing as said graduation lines, said zero being aligned with the first graduation line in said row, an index on said vernier element such that when said vernier element constituting said second poise is moved to obtain balance of the load being weighed, said index points to the numbers in said series which corresponds to the integer number of primary weight units which must be added to the value of the plural primary weight units determined by the position of said poise on the first portion of the beam, said vernier element having a mask member in which there is a row of at least 10 equally spaced apart slits constituting consecutively numbered graduation marks, the distance between said slits being equal to nine-tenths of the distance between said graduation lines on said beam, coincidence of a slit with a graduation line on said beam that is exposed and substantially centered in said slit concurrently with balancing of said beam being indicative of the tenths of weight units in addition to the integer number of weight units being weighed, the number of tenths of units being represented by the number of the slit which is coincident with the graduation mark on the beam.

10. The weighing scale according to claim 9 wherein substantial centering of a graduation line in a slit is confirmed by the fact that only an easily detectable, small part of a line will be visible in only the slits which have the next lower and higher numbers on opposite sides of said slit containing what appears to be the centered graduate line.

11. A weighing scale comprising:

a base and a balance beam and means supporting said balance beam for pivoting on said base, a first portion of said beam being on one side of the pivot and a second portion being on the other side, means on the second portion of said beam for supporting the load to be weighed, a first poise mounted for being moved along said first portion of the beam to positions corresponding to values of multiple primary weight units, a second poise comprising a vernier element movable along said beam, a series of equally spaced apart graduation marks on said beam, moving said vernier element through a distance equal to the distance between two consecutive marks changing the balance of the scale by one weight unit, said second poise having a scale defined by a series of equally spaced apart slits constituting graduation divisions having values from zero consecutively upward, the spacing of the slits constituting the divisions of the vernier scale being a fraction (F) of the spacing or divisions (P) on the balance beam where:

(P−1)/P=F a sequence of consecutive numbers on said beam, the first number being zero and following numbers going up to at least nine, the numbers being equally spaced apart at the same spacing as in said series of said graduation marks, said zero being aligned with the first graduation mark in the series of graduation marks, an index on said vernier element such that when said vernier element constituting said second poise is moved to obtain balance of the load being weighed, said index points to the number in said sequence which corresponds to the integer number of primary weight units which must be added to the value of the plural primary weight units determined by the position of said first poise on the first portion of the beam, coincidence of a slit on the vernier scale with any of said marks on the beam concurrently with balancing said beam being indicative of fractions of weight units represented by the value of the slit which is to be added to the value of the graduation mark on the beam with which said slit is coincident and added further to the value of the primary weight units corresponding to the position of said poise on said first portion of the beam.

12. The weighing scale according to claim 11 wherein P=10 and F=0.90.

13. The weighing scale according to claim 11 wherein P=20 and F=0.95.

14. The weighing scale according to claim 11 wherein said vernier element is comprised of opaque material and said slits are open.

15. The weighing scale according to any one of claims 11 or 14 wherein:

said vernier element has a window to which said index is adjacent to provide for visualizing the number of primary weight units that are to be added to the multiple weight units, if any, represented by the position of said poise on said first portion of the beam.

16. The weighing scale according to claim 11 wherein said vernier element is comprised of a transparent material and at least areas between and adjacent said slits are masked.

17. The weighing scale according to claim 11 wherein said slits and said division marks on said beam have widths such that when any slit is centered on a mark and the mark fills the slit, only part of a mark is visible in the slits on opposite sides of said centered slit to indicate that said centered slit is truly the slit whose value is to be read as an indication of the fractional parts of a weight unit.

18. A measuring device comprising:
a member on which there is a graduated scale comprised of a row of equally spaced apart graduation lines corresponding to a sequence of measurement unit increments,
a vernier mask element mounted for moving along said member, said mask element having a row of zero (0) to at least 10 numbered slits constituting a vernier scale, the distance between said slits being equal to nine tenths of the distance between said graduation lines, the slit that is pertinent to a measurement being made with the device being the slit in which a graduation line appears to be substantially centered, said slits being shaped such that the observed centered slit can be confirmed as centered by the fact that only an easily detectable small part of a line will be visible in only the slits which have the next lower and higher numbers on opposite sides of said slit containing what appears to be the centered graduate line.

* * * * *